United States Patent [19]
VanDyke et al.

[11] Patent Number: 5,758,371
[45] Date of Patent: Jun. 2, 1998

[54] SELF-PROPELLED INDEPENDENT MECHANICAL HANDLING DEVICE

[76] Inventors: John Paul VanDyke, 260 N. 1st St.; Irving Sangsland, 10130 Almena, both of Kalanazoo, Mich. 49009

[21] Appl. No.: 707,481

[22] Filed: Sep. 19, 1996

Related U.S. Application Data

[63] Continuation-in-part of Ser. No. 444,987, May 18, 1995, abandoned.

[51] Int. Cl.$^6$ .............................. A61G 7/10; B62D 1/20
[52] U.S. Cl. .................. 5/86.1; 5/87.1; 5/89.1; 74/498
[58] Field of Search ....................... 74/498; 5/83.1, 5/86.1, 87.1, 89.1

[56] References Cited

U.S. PATENT DOCUMENTS

| | | |
|---|---|---|
| 841,702 | 1/1907 | Martin ............................ 5/89.1 |
| 2,683,882 | 7/1954 | Smith ............................ 5/86.1 |
| 3,031,024 | 4/1962 | Ulinski .......................... 74/498 X |
| 3,999,228 | 12/1976 | Thomas .......................... 5/83.1 |
| 5,163,139 | 11/1992 | DeGray .......................... 5/86.1 |
| 5,355,538 | 10/1994 | Fulford et al. .................. 5/86.1 |
| 5,379,468 | 1/1995 | Cassidy et al. ................ 5/83.1 X |
| 5,388,289 | 2/1995 | Casperson ...................... 5/86.1 |

*Primary Examiner*—Michael F. Trettel
*Attorney, Agent, or Firm*—Christopher J. Whewell

[57] ABSTRACT

A Handling Device for disabled patients or other heavy objects is disclosed herein. This device is totally mobile, self-contained, and is free from being attached to any permanent fixtures. Its features give increased maneuverability over prior art devices. Through use of the instant invention, patients need only to be rolled on their sides in order to be picked up and subsequently transported to various locations around the home or institution. The device is operable by the patient's themselves.

20 Claims, 7 Drawing Sheets

SELF-PROPELLED INDEPENDENT MECHANICAL HANDLING DEVICE

CROSS REFERENCES

This application is a continuation-in-part of U.S. application Ser. No. 08/444,987 filed May 18, 1995 which is now abandoned.

BACKGROUND OF THE INVENTION

1) Technical Field

This invention relates to mechanical devices which are used to provide increased physical mobility to persons having a physical handicap which compromises their natural mobility capabilities. However, its use is not limited to merely moving people, it may also be used on other heavy objects in general as well.

2) Background Information

Various mechanical devices for providing for or improving the mobility of handicapped persons have been devised. In general terms the goals of all efforts devoted to improving mobility of such persons are the same, namely to provide suitable means to transport such individuals from one location to another without limitation. Of the many different devices provided by the prior art which are directed towards moving handicapped persons, all have their drawbacks concerning the ease and efficiency with which handicapped persons may be maneuvered into necessary locations.

In general, when using the prior art devices one encounters problems when attempting to deposit a patient in a location which is beyond the physical boundaries of the platform of the prior art device employed, such as a therapy fixture or a bath, etc. Conventional lift devices also cannot be employed when it is desired to place a patient in a location which has physical boundaries or other obstructions present which necessarily require permanently-fixed frames or other hardware be installed to provide requisite support of the patient. Also, most prior art mobility-conferring devices are bulky, heavy and, hence difficult for one person to handle. Further, most are generally somewhat inherently unstable due to their base dimension and construction. In particular, devices in the prior art have fixed seats which necessarily require their vertical beam members to be very long, thus necessitating large room openings for their casual use.

Prior art devices also lack utility as rehabilitation equipment for at least two reasons: 1) their lack of proper counterbalance necessary to prevent them from falling over when a patient is extended near the end of the travel of their horizontal boom members; and 2) the means by which steering is accomplished in the prior art necessarily precludes their use as therapy units since prior art steering is accomplished by rear wheels rotating at different speeds. This causes the front wheels to swing from side to side in a relatively large radius, with the result being that the patient is jerked about accordingly. This type of steering is also difficult to maneuver in small areas.

It is a fact that a great number of the approximately 1.4 million persons in the united States who reside in nursing homes are forced to reside therein primarily due to the inability of family members to physically move them in and out of their beds and chairs, and to the bathroom. Typically, it requires 2 to 3 people or a hydraulic lift and sling to maneuver some disabled.

INVENTION SUMMARY

This invention is a self-contained and self-propelled carriage comprising a lifting device which is capable moving heavy objects. By the instant invention, most of the problems which the prior art has been unsuccessful at addressing are solved. Through use of this invention, all which is required to remove a patient from a bed is the capability of a single caregiver (or the patient themselves) to manipulate the patient's body from a "resting on their back" position, to a "lying on their side" position. In other words, one must only possess the physical strength to roll the patient on their side. This represents a quantum leap in the art, and use of this device will allow handicapped persons to remain in their homes with their loved ones longer.

The control box of the unit disclosed herein is small and simple, therefore in many cases it will become possible for a previously bed-ridden person to get themselves out of bed and move about their dwelling, probably even becoming able to prepare meals, remove themselves to the toilet, and enjoy hobbies. While care-giving costs are expected to be drastically diminished through widespread use of the instant invention, these costs pale in comparison to the true value of this invention which is to restore and maintain much of the self-esteem of the disabled person, hence preserving the true nature of their individual character as a human being. None of the prior art devices mention this, and it can therefore only be concluded that prior art was directed only at machinery which one person uses to move other people, and not at a personal device which an individual can use on themselves and which is useful for restoring and/or maintaining self esteem.

This invention's object is to provide a means to enable non-disabled persons of only modest physical size to physically manipulate large disabled family members or other persons in all necessary capacities, so as to do away with the otherwise necessity of having to keep such a disabled person or family member committed to a care-giving facility or elderly home.

A further object of this invention is to provide a device which a handicapped individual can use for physical therapy and rehabilitation such as learning to walk again. The instant invention can be used ill conjunction with a harness and a pre-loaded spring, so that a user can easily re-learn to walk with a pre-calculated load of foot pressure.

A further object of this invention is to provide a device having proper counterbalance necessary to be useful for lowering persons into or near bathing units, burn tanks, toilets or other tubs.

A further object of this invention is to provide a self-propelled patient handling device which is capable of moving itself through and within the confines of an ordinary dwelling or a health-care facility by either a caregiver, or the disabled person themselves.

Additionally, the instant invention can function as a Gurney lift.

For purposes of this invention, the words "heavy object" shall include a handicapped person, regardless of their weight.

DESCRIPTION OF THE DRAWINGS

The detailed description particularly refers to the accompanying figures in which.

3

DETAILED DESCRIPTION OF INVENTION INCLUDING A PREFERRED EMBODIMENT

The instant invention is a patient Handling Device which is completely self-contained.

The instant Handling Device consists of a main frame portion to which all necessary hardwares and equipment are attached. The frame portion consists generally of a wheeled base, having two wheels affixed to the underside of its front portion and two wheels affixed to the underside of its rear portion. The wheels on the front forked portion of the frame are the rolling wheels and do not provide any motive power. They may be of the standard conventional round type which are axle-mounted, they may be caster wheels or any other type of wheel which merely rolls. It is through the rear wheels that the energy for propulsion is transmitted. The rear wheels are mounted to the unique assemblies which are used herein to simultaneously control propulsion and steering, and which confer extreme mobility to this device and make it suitable for a wide range of applications heretofore unseen in devices of this type. These special steering/drive assemblies shall hereinafter be referred to as "VanDyke assemblies".

Resting atop the frame portion is a box-like portion in which are housed the various electrical and mechanical components of this device. Protruding strait up from the top portion of this box is a vertical beam to which is perpendicularly affixed a horizontal boom having a lifting means accessible at its open end. The lifting means is used to lift patients or other objects onto a seating means which is attached to the front panel of the box portion of the frame. The person may then be transported to a desired location.

In the most preferred form of the invention, all parts of the frame are constructed of sheet and/or beam steel stock, although the use of other materials such as high strength' polymeric composites, stainless steels, all metals or alloys thereof, particularly aluminum alloys, etc., are contemplated by this invention with the requirement that the material must be sufficiently strong to support the weight which is desired to be transported or manipulated.

To better describe this invention, the components shown in the figures of the drawings are now set forth in detail.

Figure 1:
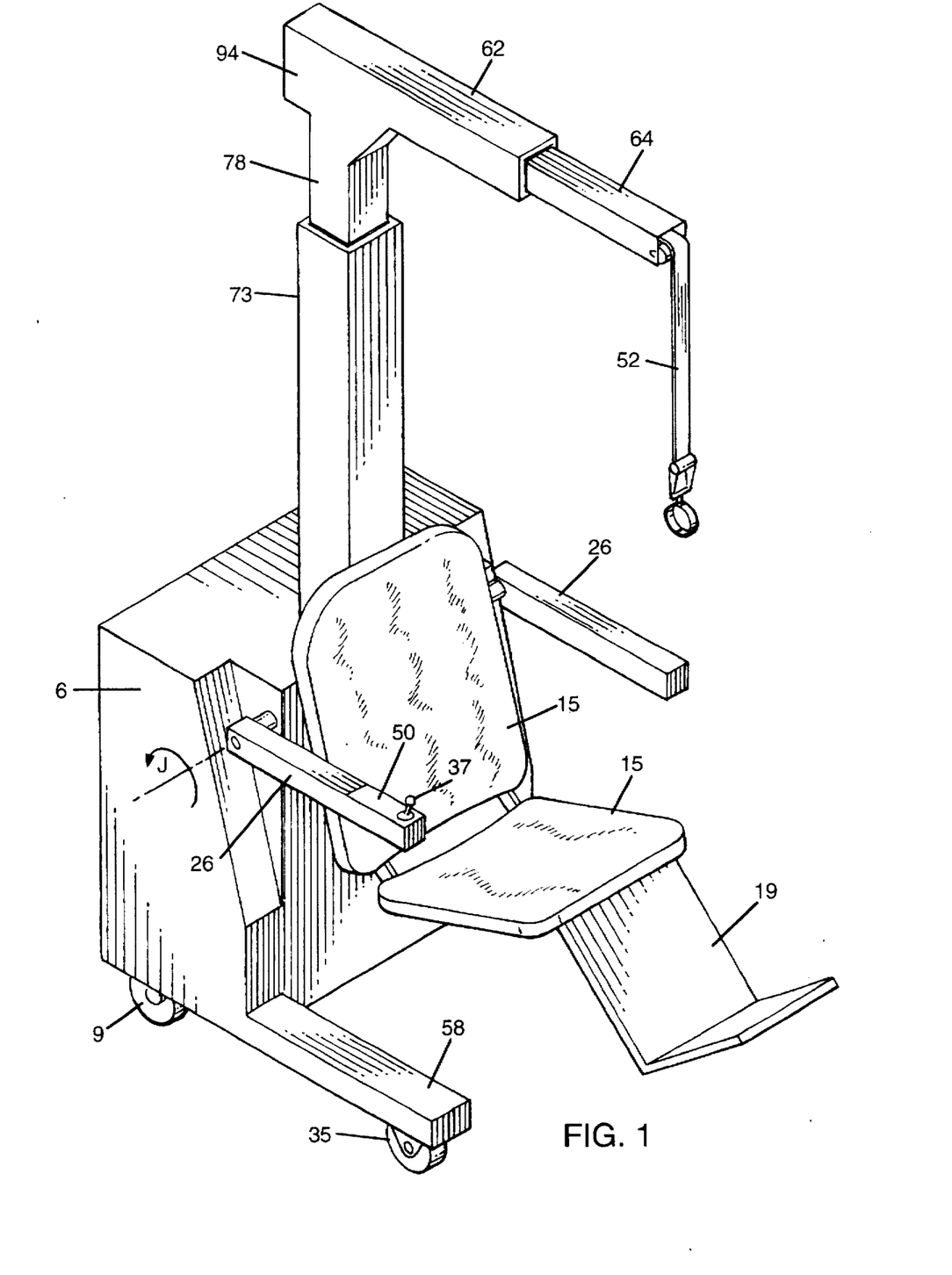
FIG. 1 is a perspective drawing of the handling device in accordance with the present invention.

FIG. 1 is a perspective drawing of a preferred form of this invention. In this drawing 15 represents the seating means, 19 represents a leg support means, 6 represents the box-like housing portion of the invention. This housing has seating means 15 attached to its front portion, 58 represents one of

4 two fork portions which are a part of the main frame portion. 26 represents the "swing-back" arm rests. 73 describes the outer portion of the motor-actuated vertical beam assembly. 78 is the inner portion of the motor-actuated vertical beam assembly. 62 describes the outer portion of the motor-actuated telescoping horizontal boom with internal pulley. 64 describes the inner telescoping portion of the horizontal boom. 9 describes one of the drive wheels, 35 describes the stationary (rolling) wheels. 37 describes the control joystick. 50 is the removable control box, and 52 describes the lifting means which is used to convey lifting force. 94 is a box-like area at the rear end of the horizontal beam assembly in which electrical controls are housed.

Figure 2:
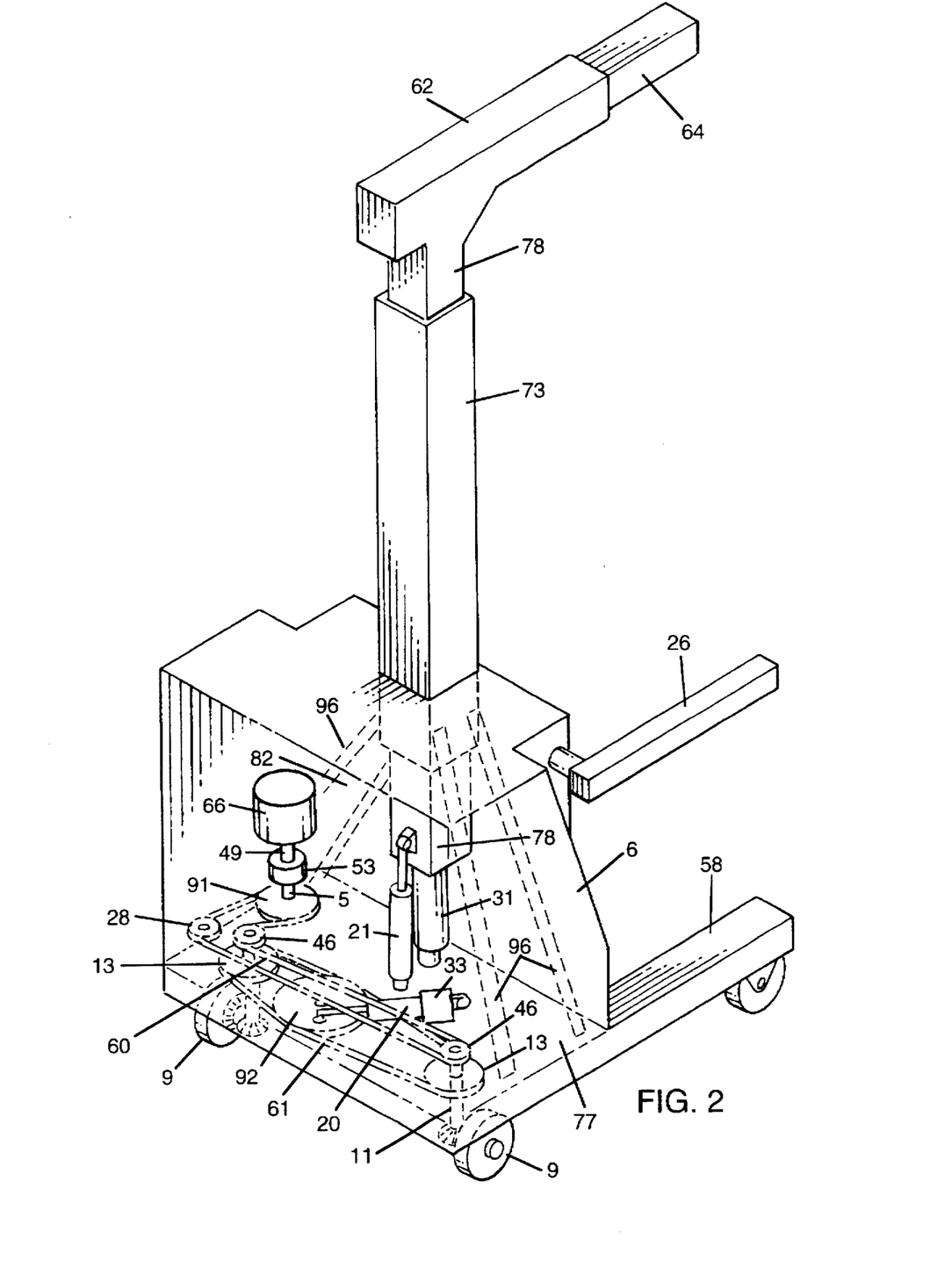
FIG. 2 is a perspective view of the inner portion of the main frame box portion 6 of FIG. 1 as viewed from the rear of this handling device.

FIG. 2 is a perspective view of the inner portion of the main frame portion 6 of FIG. 1 as viewed from the rear of this Handling Device. This figure shows the relative positions of the essential motive and steering components used thereon.

The flat portion of the frame is comprised of two arm portions which are forklike (58 in FIGS. 1, 2, 3, and 4) and which protrude from the front of the rectangular box portion 6 at its base. On surface 77 the VanDyke assemblies and other hardwares are mounted. On the underside of the protruding forks are mounted the "rolling" wheels. These provide no motive force. They are mounted on common wheel brackets and axles.

The box portion 6 is preferably rectangular in geometrical dimension and is located atop flat floor portion 77. Preferably, the walls of the box portion are welded together and to the floor portion as well, but any other means of attachment is permissible. Within the box portion 6 may be included ballast weights for the purpose of increasing the stability of this device when very heaby objects are lifted. Prior art devices for moving medical patients or the elderly were unable in many cases to lift heavy objects from certain locations with respect to the center of leverage of the devices since they would topple over. Although the instant device is inherentlymore stable than prior art devices, its stability may be further increased by adding ballast weights to the box area 6.

The inner housing area 82 is defined by the walls of the box portion 6. This is merely a hollow region in which necessary component parts of this invention are housed.

In FIG. 2, 62 is the outer horizontal boom member, 64 is the inner horizontal boom member, 78 is the inner vertical beam member, 73 is the outer vertical beam member, 26 is one of the foldable arm rests, 96 is a structural support member of the vertical beam assembly, 21 is the vertical beam actuator, 9 is a drive wheel, 11 represents the drive shaft of the VanDyke assemblies.

The preferable way in which motion of the instant device is effected is now set forth. Motor 66 is energized which causes shaft 49 to rotate. Such rotation is regulated by reducing gears in housing 53, the output of which is conveyed to sprocket gear 91 by means of shaft 5. Motive energy is transmitted to the VanDyke assemblies by means of drive chain 60. Drive chain 60 is routed from drive sprocket gear 91, around idler gear 28 which is attached to the main frame 77 by conventional means (mounting not shown) which includes a bracket and nuts and bolts. The drive chain spans over to the drive sprocket 46 of the right side VanDyke assembly, then back to the drive sprocket 46 of the left side VanDyke assembly, and back around the drive sprocket 91 in a serpentine fashion as later shown in FIG. 6A. When motive power is supplied to sprocket 46 by means of drive chain 60, shaft 11 rotates either clockwise (cw) or counterclockwise (ccw) and through means of the miter gears 24 and 72 drive wheel 9 is caused to rotate, thereby causing motion of the device as a whole.

The speed of locomotion is regulated by changing the electrical voltage and/or current available to the motor by means of suitable switches, rheostats, variable resistances as are well known in the art or, as is currently preferred, a common "joystick". The motor may be caused to run in reverse direction, thus causing the instant Handling Device to move backwards. Alternatively, an alternating current motor may be used in conjunction with diodes or other necessary rectifiers or current inverters as are well known in the electrical art.

Energy supplied to the drive wheels of this invention is provided by an electrically energized direct current motor 66 of FIG. 2. The electricity comes from a conventional storage cell which may be of various types as are common in the art of batteries and include such cells as, for example conventional lead-sulfuric acid, nickel/cadmium system, gel cells, sodium/sulfur system, lithium system, etc. The type of storage cell employed is not critical to operation, however it is preferable to employ a battery system having the greatest amp hour to mass ratio. The most preferred embodiment utilizes a gel-cel system, and example of which is model no. M-27MF by Delco, a division of General Motors. The storage battery is located within the housing 82. In the preferred form of this invention, the main locomotion drive motor is affixed to the frame by conventional mounting means.

Steering is accomplished by energizing motor 33 which drives actuator 20. The actuator used here is from Linak Actuator company, Bethel Park, Pa., model NO. LA 25.210, and moves in and out.

This actuator is connected to a steering sprocket 92 at a location approximately half way between the centerpoint of the sprocket and its outer circumference via any suitable connecting means, preferably a solid lever, to actuator 20. This steering sprocket is conventionally mounted to the horizontal surface of the inner rear portion of the frame by means of a bearing through its center in such a way that it is free to rotate in response to movement of the actuator 20. The steering sprocket is located inbetween and connected to both of the two of the steering control sprockets 13 of the VanDyke assemblies. A second bicycle-type chain 61 is routed around the steering gears 13 of both VanDyke assemblies with the steering control sprocket centrally located therebetween and on the same plane, said control sprocket being slightly offset so as to maintain an effective amount of tension for causing either or both of sprockets 13 to be effectively turned and/or controlled. Thus, when the Handling Device of this invention is in motion steering is effected by causing sprockets 13 to rotate. As an alternative to the preferred form of the invention, the steering sprocket need not be used, and the actuator is linked directly to the steering control chain. The terms "steering means" as used in this specification and the appended claims embraces both embodiments where in one a sprocket 92 is used, and in the preferred form wherein it is absent. Steering means includes all motors, gears, linkages etc necessary to effect rotation of frame 18 of the VanDyke Assemblies with respect to the base frame 77 of this device.

For purposes of this invention the term "means for propulsion" includes a drive motor 66, and all gears, linkages, chains, etc. required to deliver motive energy to shaft 11 and cause the drive wheels to turn as a result of energization of motor 66, including conventional means of conveying motive energy to a shaft.

This invention also includes the use of a differential (not shown) in its most preferred form. In this invention, to each shaft of a standard differential is mechanically connected the drive sprockets 46 of the VanDyke assemblies, preferably by means of a bicycle-type chain. Under such an arrangement the most preferred embodiment, referring to FIG. 2, sprocket 91 drives the sprocket 46 of the left-side VanDyke assembly and one output shaft of the differential. Another sprocket rides on the other output shaft of the differential, and is fitted with a separate drive chain which is independently connected with the sprocket 46 of the right-side VanDyke assembly. The differential preferably is of the non-positraction type which has been used in the rear axles of automobiles. However, the positraction type may be employed also. The differential preferably rests on the left-hand VanDyke assembly, and by using a drive shaft on the left-side VanDyke assembly which extends vertically about a foot above the deck 77, it is beneficial to employ such an extended drive shaft as a support around which the differential housing may be conveniently constructed. Alternatively, a standard differential may be mounted to the inner wall portion of the main frame and connected to the drive sprocket 91 and the sprockets 46 by any conventional means. Through such arrangements, skidding of the wheels is eliminated in the instant device when rounding sharp corners or traveling at rapid speeds, thus increasing further the mobile stability of this Device.

Figure 3:
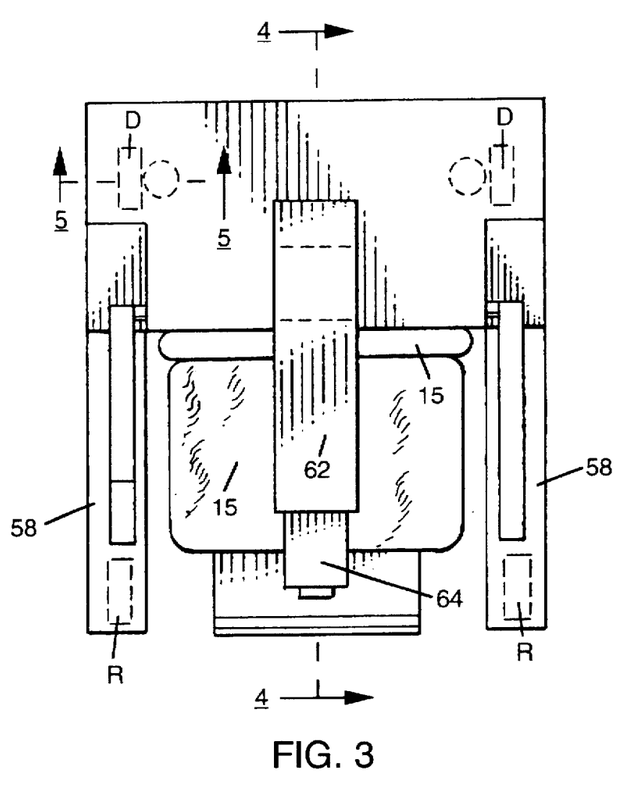
FIG. 3 is a top view of the handling device of this invention.

FIG. 3 shows a top view of the Handling Device of this invention. In this figure, the leg or "fork" portions 58 of the frame are shown. The rolling wheels 35 are positioned on the underside of the leg portions at locations marked "R". The drive wheels are positioned on the underside of the rectangular box area of the frame in approximate locations marked "D". Also pictured are the inner 64 and outer 62 portions of the horizontal boom, and the seating means, 15.

Figures 4, 5:
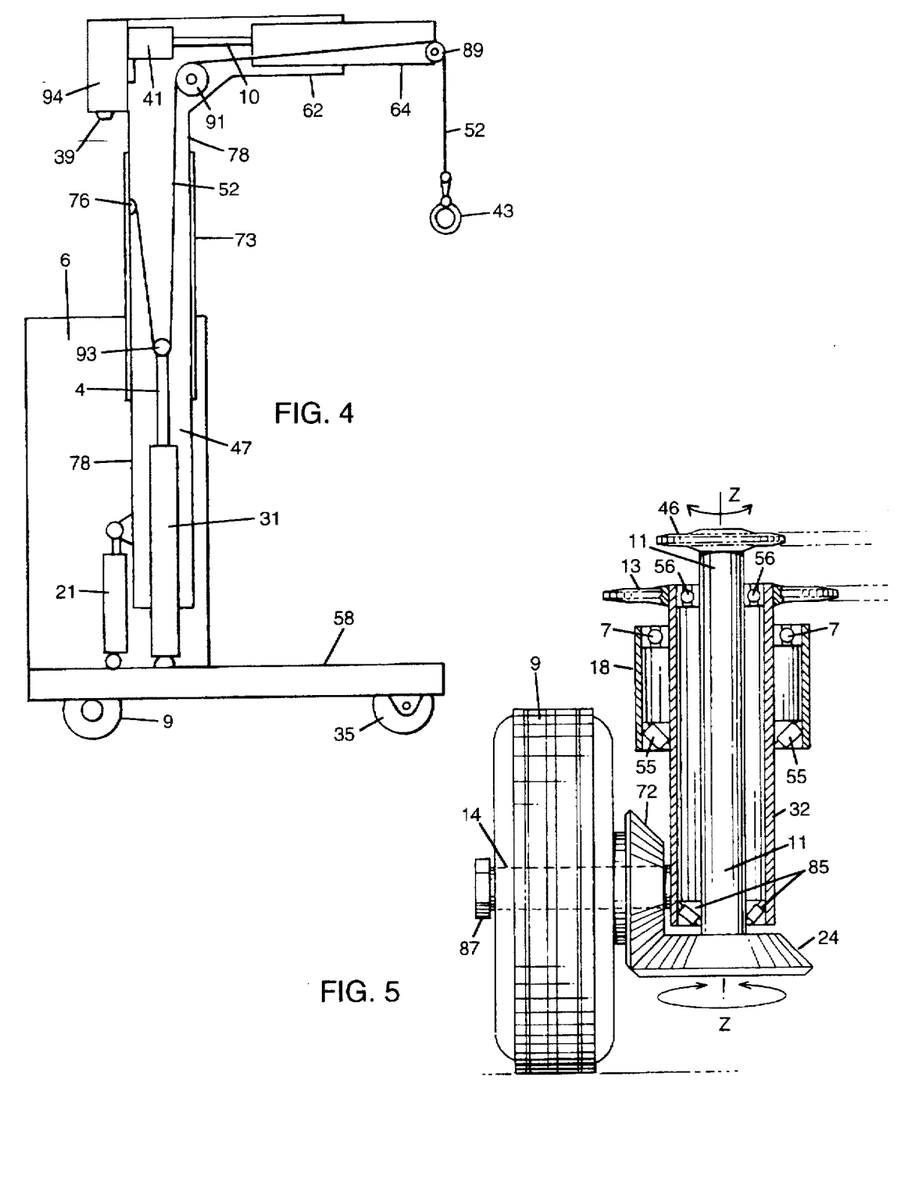
FIG. 4 is a sectional view therein, as shown through section 4—4 on FIG. 3.
FIG. 5 is a partial sectional view of one of the special steering/drive assemblies of this invention as shown through section 5—5 of FIG. 3.

FIG. 4 is a sectional view of the instant invention as shown through section 4—4 on FIG. 3 depicting the various means employed to cause requisite movements of the component parts of the invention. In this figure, 6 represents the box portion, 64 is the inner member of the horizontal boom assembly, 62 is the outer portion of the horizontal boom assembly, 41 is the horizontal boom assembly actuator which is connected mechanically to 64 by conventional connecting means 10. The vertical beam assembly consists of an outer guide portion 73 and an inner movable portion 78. 47 is a hollow space inside the inner vertical beam assembly member. Vertical motion of the vertical beam is effected by energizing actuator 21 which is in mechanical linkage with the inner movable portion of the vertical beam by means of conventional coupling means. Housed within the vertical beam and horizontal boom assemblies is lifting means 52. The lifting means 52 rides on pulleys 89, 91, 93 and is terminally connected to a point on the inside of the vertical beam at point 76 by conventional means. Actuator 31 is housed near the bottom of the vertical beam assembly, which when operated causes motion of conventional linkage 4 either upwards or downwards, thus causing lifting means 52 to either move upwards or downwards at pulley 89, providing lifting or delivery capability of any harness connected to the link at 43. Actuators 21 and 41 are for causing the separate motions of the inner vertical beam assembly member and the inner horizontal boom member respectively. 94 is a hollow portion at the rear of the horizontal boom in which electrical controls may be housed. 58 represents one of two fork portions which are a part of the main frame portion. Also shown is drive wheel 9, and non-drive wheel 35.

In FIG. 5 is depicted a partial sectional view of one of the Vandyke Assemblies as shown through section 5—5 of FIG. 3. It is through this device that control of both motive propulsion and steering are accomplished.

The words "VanDyke Assemblies" as used in this specification means the mechanical combination represented in FIG. 5. These are mechanisms which are useful for controlling the steering and propulsion of not only the instant invention, but probably many other devices in this and other fields of art. The VanDyke assemblies as used in the instant invention are mirror images of one another, but this is not necessary.

This assembly comprises an outer hollow frame 18 (which is cylindrical in the preferred form of the invention) inside of which is mounted an inner hollow cylindrical casing 32, said inner casing being capable of rotational motion about the "z" axis (independent of said outer housing), by virtue of its being mounted within said outer housing 18 by means of radial bearings 7 (such as KP series radial 1YKE by Fafnir Co. and sold by Detroit Ball bearing Company of Mich. and tapered-type wheel bearing 55 (such as standard automobile wheel bearings sold by Timken Co. and available from the same source just mentioned. Inside of the inner casing 32 is contained a drive shaft 11 which is mounted to the inner casing by means of tapered bearings 85 and roller bearings 56, analogous to those just described above. This arrangement allows for the rotation of the driveshaft 11 within the inner casing 32, and it allows for rotational movement of the inner casing 32 independent of both the outer housing 18 and the drive shaft 11. On the upper end of the drive shaft 11 is a toothed gear of any type, but for purposes of this invention the type commonly employed in the bicycle art is preferred, such as those made by Browning Co. of Maysville Ky., no. 35 chain & #35 sprocket with keyway. At the lower end of the driveshaft 11 there is affixed a mitered gear 24 (or "spiral miter gear") such as model No. YSMS 10F20 RH x 3/4, by Browning company of Maysville, Ky., or a functional equivalent. The mitered gear 24 is in mechanical meshing contact with another mitered gear 72. Mitered gear 72 is in mechanical connection to the drive wheel 9 which is mounted on axle shaft 14 and held in position by conventional means such as a cotter pin, lock nut, etc. and 87 is the wheel hub. In mechanical contact with casing 32 is gear 13, which is used to control the steering of the assembly.

In the instant invention the outer frame 18 of the VanDyke assembly is permanently affixed to or made mechanically unified with the main frame portion 6, or is preferably affixed to the deck of 77 of this device by first cutting holes at appropriate locations in the deck itself which are only slightly larger than the outer frame 18 of the VanDyke assembly and then inserting the VanDyke assembly into the hole at an effective depth and effecting a weld.

Operation of a VanDyke Assembly is as follows. When sprocket 13 is caused to be turned, (for example by means of a chain 61) it causes inner casing 32 to be accordingly rotated about the "z" axis. Since axle 14 upon which drive wheel 9 is resident is permanently attached to casing 32, the direction in which drive wheel 9 faces with respect to the frame of this device may be controllably altered. Thus a change in the direction of the motive force exerted by the wheels is achieved by turning casing 32. Although a sprocket 13 is used in the preferred form of the invention, other means for causing rotation of outer frame 18 are herein including the use, for example, of eyelets affixed to the outer periphery of frame 18 in conjunction with guy wires, levers, etc and appropriate means for actuating same.

For locomotion to the wheels, power is transmitted from the shaft of the drive motor through a conventional reducing gear assembly, the output shaft of which has a chain sprocket attached to its end. By means of a bicycle-type drive chain, the output power of the reducing gear assembly is transmitted to the drive shafts (11) of the VanDyke assemblies of FIG. 5, the other ends of said inner shafts having miter gears attached thereto, said miter gears being contacted to another miter gear which is connected to each drive wheel by means of an axle, thus effectively communicating motive power to the drive wheels 9. The drive wheels 9 may be solid hard polymeric natural rubber or common butadiene/isoprene rubber or other rubbers commonly employed as tire materials which are well known as tire materials in the art. In the most preferred form of the invention, the tires are of the hollow inflatable type to provide more of a cushioned ride. The drive wheels are each rotatable 360 degrees by virtue of the design of the VanDyke assemblies already described herein, but are equipped with stops which enable them only 180 degree rotation, in the preferred form of the invention. This 180 degrees spans from 90 degrees to the left of forward, to 90 degrees to the right of forward. All portions of the VanDyke assemblies are steel, although other materials of construction are contemplated as being suitable such as aluminum or magnesium alloys, stainless steel, resilient polymers or polymeric composites, etc., provided that the overall functioning is the same, namely that it is possible to control the drive speed and the steering independently of one another by the arrangement herein set forth.

Figure 6:
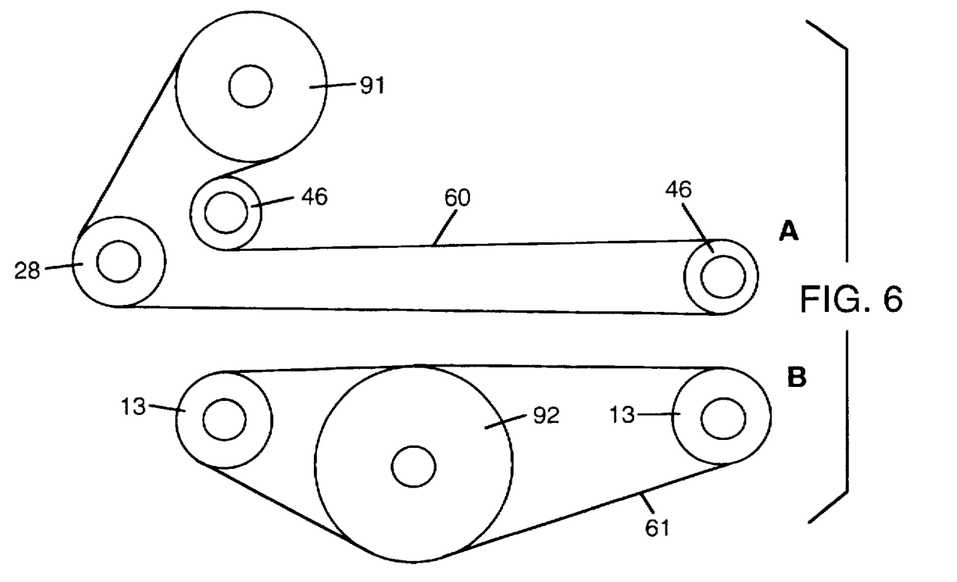
FIG. 6A shows the relationship of the linkages necessary for the locomotion of the instant invention.
FIG. 6B shows the relationship of the linkages necessary to effect control of the steering of the instant invention.

In FIG. 6 are depicted for clarity overhead views of the relations between the gear sprockets and the drive chains which were shown in FIG. 2.

In FIG. 6A, the relationship of the linkages necessary for the locomotion of the Handling Device of this invention is shown. Here, 91 is the main drive sprocket which is in direct mechanical linkage with the output shaft 5 of the reducing gears 53 from FIG. 2. As sprocket 91 rotates, energy is transferred to the drive sprockets 46 of the VanDyke assemblies, which causes the drive wheels 9 in FIGS. 1,2,3, and 4 to rotate. Tension in bicycle-type chain 60 is maintained by idler sprocket 28 which may be mechanically biased towards this end via conventional biasing means.

In FIG. 6B is shown the relationship of the linkages necessary to effect control of the steering of this Handling Device. Here, steering sprocket 92 (which is controlled by steering actuator 20 of FIG. 2) is in mechanical linkage with steering sprockets 13 of the VanDyke assemblies shown in FIG. 2 by means of a chain. When sprocket 92 is caused to rotate, sprockets 13 are caused to rotate accordingly, and steering of the instant Handling Device is thus affected.

Figure 7:
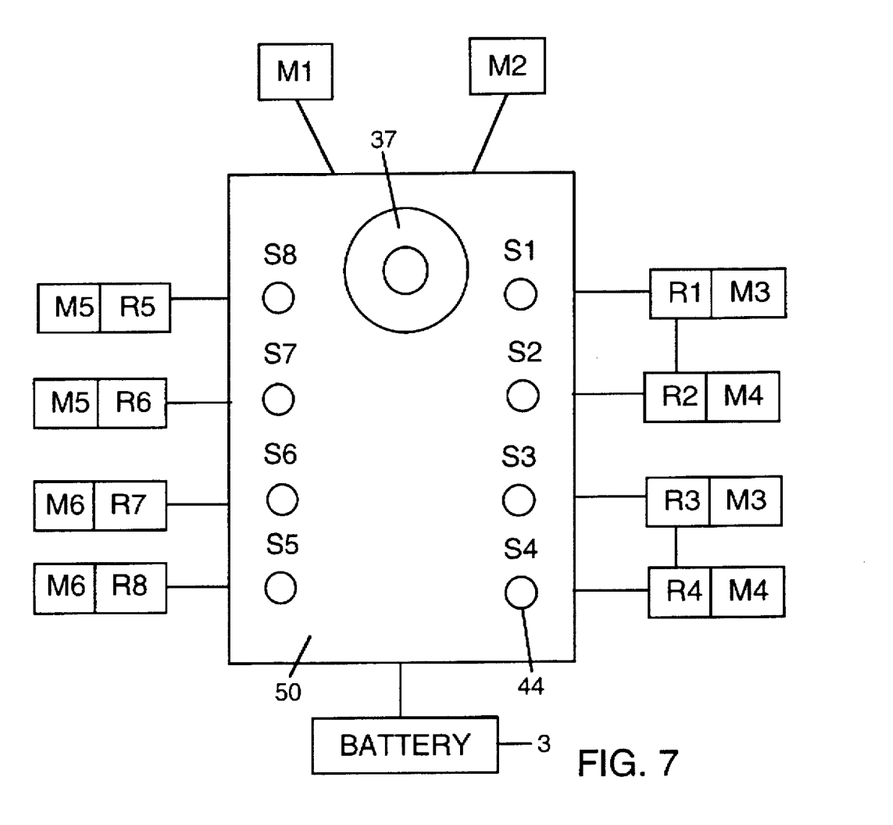
FIG. 7 shows a block diagram of the electrical controls of the instant invention.

FIG. 7 shows a block diagram of the electrical controls of the instant invention, and depicts the relationship of the various relays, switches, joystick, motors, and actuators to one another in a preferred form of the invention. Here, the push-button switches S1 through S8 are shown on the face of the main control box 50, as well as the preferred position of the control joystick 37. The relays, prefixed with a letter R, function as switches to control the electrical energy relayed to the various motors used to drive the chains and actuators used in this device.

The motors are prefixed with a letter M. In this figure, M1 represents the main drive motor, M2 is the steering actuator motor, M3 operates actuator 41 of FIG. 4, M4 operates actuator 31 of FIG. 4, M5 operates actuator 67 of FIG. 8, and M6 operates actuator 21 of FIG. 4. Not shown in this figure is the connection which exists between relays R8 and R4, and that between relays R7 and R2 which is described in the detailed description.

Figure 8:
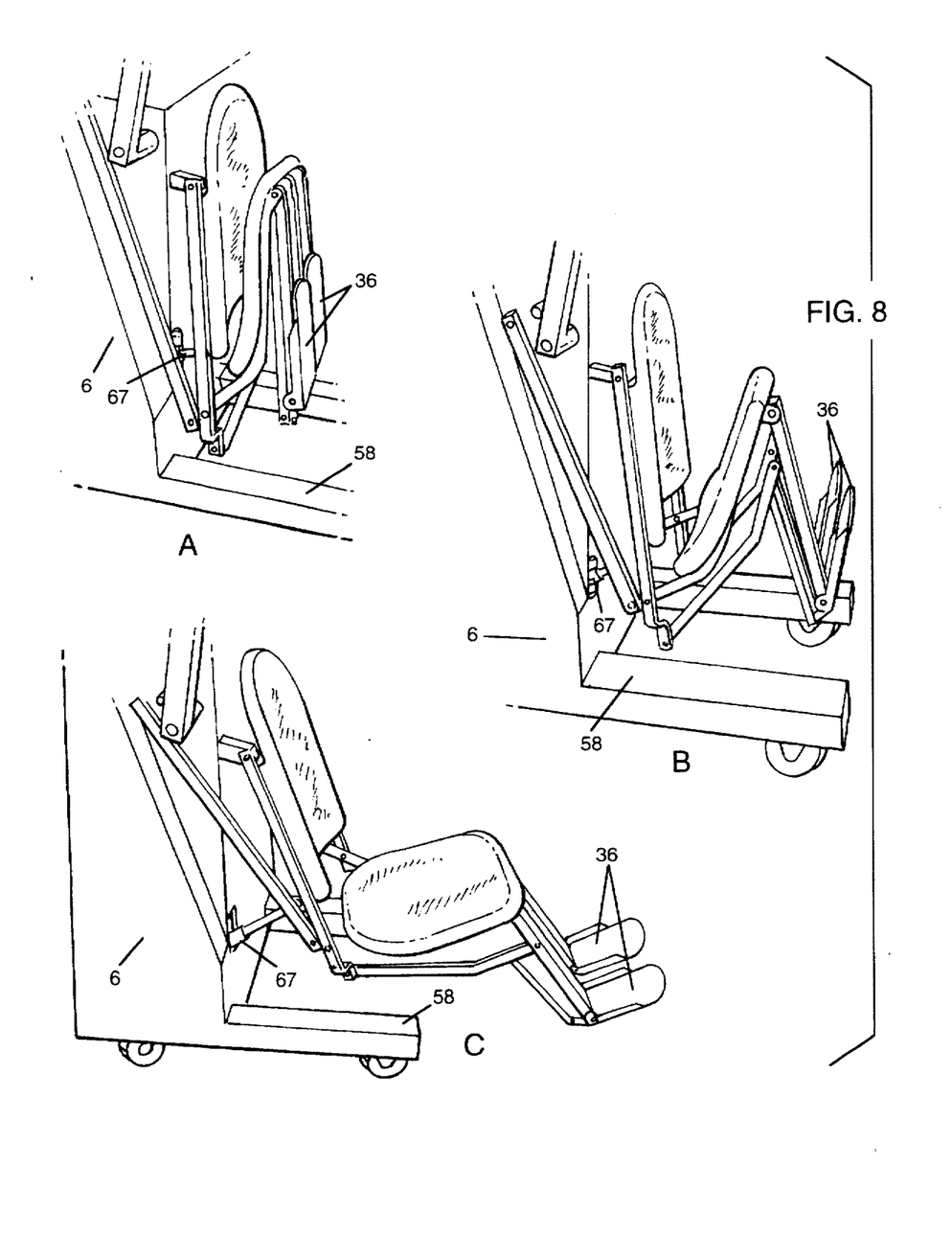
FIG. 8 depicts the collapsible "hard seat" which is used in a preferred form of this invention

FIG. 8 depicts the collapsible "hard seat" which is used in a preferred form of this invention. This figure shows the relationship of the hard seat to the box 6 and the forks 58 the underside of which the front fixed non-drive wheels are positioned. This figure shows how the hard seat is collapsible by means of operation of actuator 67 which is located within the main frame and is controlled in the same fashion as the other actuators used hereon. Foot support portions 36 are also depicted.

The seating means is mounted by conventional means such as welding to the rectangular box portion as shown in the figures.

Figure 9:
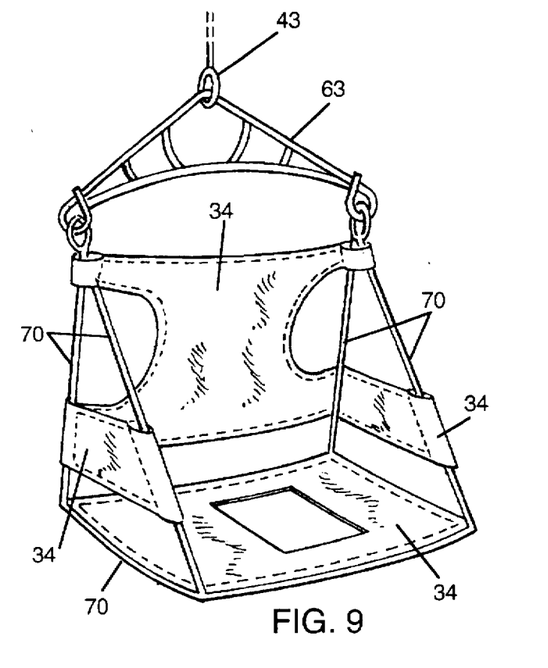
FIG. 9 is a perspective view of the "soft seat" used in this invention.

FIG. 9 is a perspective view of the "soft seat" of this invention. The soft seat comprises frame members which may be steel rod or polymer-coated flexible steel cable (preferred). 34 depicts the location of the flexible fabric or metal mesh which is used to hold and support the patient, the bottom section of which has a void for elimination. 63 is the hangar frame portion, the ends to which the support members 70 are attached. 43 depicts the connecting link for use between the hangar 63 and the lifting means 52 of FIG. 4.

Figure 10:
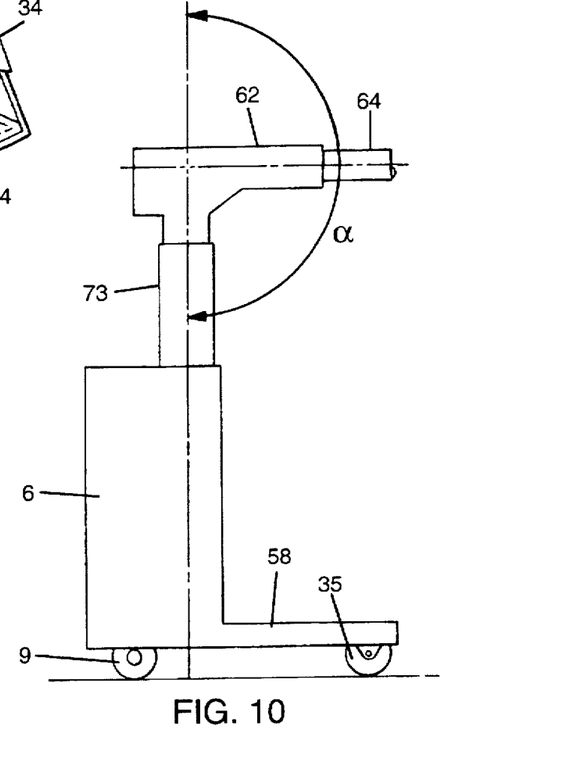
FIG. 10 is a side-view depicting the angular configuration of the vertical beam and horizontal boom of this invention. In this figure, angle alpha is 90 degrees.

FIG. 10 describes the angle alpha defined with its vertex at the junction of the horizontal beam and vertical boom assemblies of this device.

Shown in FIGS. 1, 2, and 3 attached to the right side of this Handling Device are hinged arm rests 26. These arm rests may be swung backwards and out of the way whenever required. They are preferably mounted upon axles which are provided with stopping means ("stops") so that whenever it is desired to rest one patient's arm upon them they remain in an approximately horizontal position as is typical of any arm rest used on most types of furniture, automobiles, etc. Such armrests swing back in the direction indicated by the arrow next to the "j" axis in FIG. 1. It is upon either one of these arm rests 26 near the outward end where the hand naturally rests that the control box 50 is removably affixed.

Also attached to the frame portion are the means for controlling the steering of this device. These components are shown in FIGS. 2 and 6A. Particularly, there is a bicycle-type sprocket which is rotatably mounted centrally on the floor area 77 of FIG. 2. This sprocket is mounted on a shaft which is housed in a standard bearing which is affixed to the floor area 77 such that the sprocket 92 is free to rotate in the same plane as the floor area. A chain of the type commonly used in the bicycle art is positioned around sprocket 92 and both sprockets 13, according to FIG. 6B. When the sprocket 92 is then caused to be rotated by action of the actuator 20 in FIG. 2, the steering sprockets 13 are accordingly rotated and the drive wheels 9 are turned in synchronous, so as to effect total steering control of this device.

The terms "means for steering" as used in this specification and the appended claims means collectively, for the most preferred form of the invention the VanDyke assemblies, the steering control chain 61 and sprocket 92 or other means, for causing sprockets 13 to be controllable rotated, a steering actuator 20, and motor 33. This invention also contemplates the use of other conventional means by which vehicles are steered, and such other means as rack and pinion or standard automobile steering controls are included.

An outer vertical beam portion 73 is affixed to the rectangular box portion of the frame by welding or by other fastening means which are well-known in the art which may also include the use of flanges and nuts and bolts. The particular means employed to fasten the vertical beam or any of the necessary components of this invention to one another is not a critical parameter. What is critical is that any fastening must provide an effective amount of coupling necessary in order that a given coupling or fastening does not rupture or come apart when heavy objects are lifted.

In the preferred form of this invention, the outer vertical beam member consists of steel stock in a substantially hollow rectangular solid configuration having approximately square dimensions as viewed from a cross section, although other shapes such as round tubular steel or oval shaped, etc are also anticipated as being useful herefor. The outer vertical beam is preferably welded to the box portion 6 of the frame at the point of its contact therewith, and reinforced by one or more supporting beams such as 96 in FIG. 5. The inner vertical beam 47 is identical in construction as the outer vertical beam with the exception that its width and height dimensions are slightly less than those of the outer portion, thus allowing for insertion into, and movement inside of, the outer vertical beam portion. Preferably a bearing or a plurality thereof are employed between the outer and inner beam assembly members for easier sliding. Near the bottom end of the vertical beam assembly (which includes both the inner and outer members) is an actuator 21 shown in FIGS. 2 and 4, one end of said actuator being attached to the floor area 77 of the frame as shown in FIG. 4, and the other end of which is attached to the inner portion of the vertical beam such that when the actuator 21 is energized, the inner portion of the vertical beam is caused to move either upwards or downwards inside of the outer portion of the vertical beam assembly. It is this type of motion which provides the Handling Device with the capability on the one hand of having an overall height dimension which allows it to not be easily obstructed and limited by standard door heights, while on the other hand once inside a room, the vertical beam may be raised sufficiently to allow mechanical advantage over ordinary bedroom and/or household fixtures such as beds, baths, exercise and therapy equipment, or other obstacles. Housed within the vertical beam assembly is lifting means 52, which rides on pulleys or guides 89 and 91, and is terminally connected to a point on the inside of the vertical beam at point 76 by conventional means such as a nut and bolt. Motion of the lifting means 52 is effected by energizing actuator 31 which causes motion of linkage 4 either upwards or downwards, thus causing lifting means 52 to either move upwards or downwards at puller 89, thus providing lifting or delivery capability of any harness connected to the link at 43.

For purposes of this invention the words "vertical beam assembly" means both the inner and outer vertical beam members and includes the motor and actuator and all linkages used to cause the vertical motion of the inner beam member within the outer beam member.

For purposes of this invention, the terms "lifting means" means any conventional wire, cable, woven fabric, rope, cord, or other such equivalent lifting material as is commonly known and used in the art for lifting and as is sufficiently strong and suitable for lifting heavy objects up to 100000 lbs or persons by virtue of its motion which is caused by controllably energizing the actuator 31, and is otherwise suitable for use as described herein. In the most preferred form of this invention, the lifting means is a woven nylon strap a quarter of an inch thick and two inches wide.

The vertical beam protrudes upwards from the rectangular housing in an approximately perpendicular attitude with respect to the ground in the most preferred form of this invention, however, the use of other angles of attachment is contemplated for special circumstances. Therefore, when considering the term "vertical beam assembly" it must be borne in mind that this terminology is not intended to be restrictive of the attachment of this component to being absolutely vertical, since such absolute verticality of this component is not essential to the function of this device as a whole.

For purposes of this invention the words "horizontal boom assembly" means both the inner and outer horizontal boom members and includes the motor and actuator used to cause the horizontal motion of the inner boom member within the outer boom member. Preferably a bearing or a plurality thereof are employed between the outer and inner boom and beam assembly members for easier sliding of these parts.

Attached by conventional means such as welding or brackets to the upper portion of, and in a configuration which is preferably essentially perpendicular to the vertical beam outer member 73 of this invention is a horizontal boom which includes an outer member 62 and an inner member 64. As in the case of the vertical beam, both members of this assembly are constructed of steel in a rectangular solid configuration, in the most preferred form of this invention, with the inner member 64 of the horizontal boom being slightly less in diameter than the outer so as to be movable or slideable within the outer member. The inner member of the horizontal boom is hollow and is caused to be mobile by means of an actuator which is located inside of this boom assembly. One end of this actuator is affixed to the outer stationary member and the other end is affixed to the inner member. When the actuator is energized, the inner member can be made to move either in or out of the horizontal boom. The horizontal boom assembly may also be round tubular in shape, or triangular, etc. In the preferred form of this invention the rear of the horizontal boom contains an area in which are housed necessary electrical connections and controls. The front end of the horizontal boom is open so that the lifting means may be accessible for use.

The horizontal boom is attached to the vertical beam as shown in the figures in an arrangement which is approximately perpendicular to said vertical beam section, in the most preferred form of this invention. However, the use of other angles of attachment is contemplated for special circumstances. Therefore, when considering the term "horizontal boom assembly" it must be borne in mind that this terminology is not intended to be restrictive of this component to being absolutely horizontal, since such absolute horizontality is not essential to the function of this device. The angle alpha which the horizontal boom assembly makes with respect to the vertical beam assembly is in the range of about 15 degrees to 165 degrees.

Mechanical actuators are used in the preferred form of the instant invention to provide motion of mechanical parts with respect to one another as in the case of the movement of the inner vertical beam within the outer vertical beam on the one hand, or to provide control of the steering by causing the rotational movement of sprocket 92 in FIGS. 2 and 6 to be strictly regulated. These actuators are well-known in the art of mechanics and motion. The actuators preferred for use in this invention are made by the Linak Company and are linear actuators of which models no. LA 25.210, LA 30.3s, and LA 38.4 of Linak Actuator company already mentioned are exemplary. They are all operated by direct current motors which are gear reduced. The actuators have ball screw shafts. The following is descriptive of the actuators employed herein:

steering actuator, #20 in FIG. 3—LA 25.210, 5.9 inches of travel seat actuator, #67 in FIG. 8—LA 30.3s , 5.9 inches of travel strap actuator, #31 in FIG. 2—LA 38.4, 27.4 inches of travel vertical boom actuator, #21 in FIGS. 2,3—LA 30.1s, 13.8" of travel horizontal boom actuator, #41 in FIG. 4—LA 30.1s, 13.8" of travel These actuators, or their functional equivalents are herein indicated as being useful in this invention.

The preferred motors used in this invention are direct current (DC) motors such as model 62412 by Dayton Company (Dayton, Ohio) which is used as the main drive motor. All actuators are driven by electrical motors which are integral with the motors and are controlled via the main control box 50.

There are two means provided for the seating of individuals who are the subject users of the instant invention. One shall be referred to as the "hard seat", and the other as the "soft seat". As used in this specification and claims the terms "seating means" shall include either or both of these.

The "soft seat" used in the preferred form of this invention is a special harness which was designed especially for use with this invention, and is depicted in FIG. 9. It has back and side support sections which are made of flexible yet strong woven fabric 34, (such as nylon, polypropylene, kevlar, preferrably cotton, or any other suitable fabric having sufficient physical strength to hold any person or heavy object which may occupy such soft seat) a bottom seat section with a rectangular hole in its approximate center for elimination, reinforcing supports 70 made of wire (preferably a flexible steel cable which is coated with a polymer such as nylon or polypropylene) or other suitably strong material which shall support any person occupying such soft seat, and a hangar harness 63 which is connected to the loop 43 of FIG. 4 by means of a hook, chain, wire, or other suitable linkage. The hangar harness is preferably made of sufficient diameter steel or other suitably strong material and is shaped much like a conventional coat hangar.

The soft seat is used to pick up patients from various locations and place them onto the hard seat which is described below. To fit the soft seat to a person requires the following 3 steps: 1) roll the patient onto their side; 2) place the soft seat under the patient; and 3) roll the patient back onto the soft seat. The soft seat is, by its nature flexible and assumes the form of a flat plane when placed on a flat surface such as a bed and next to the patient. Once the patient is rolled atop the soft seat, proper energization of actuator 31 in FIG. 4 causes lifting means 52 to lift up on the soft seat, thus comfortably raising patient to a "suspended in the air" position.

The hard seat, in its most simplistic construction, is merely a rigid chair having a bottom portion, a back portion, and a foot rest portion as shown in FIG. 1 of this invention. Alternative to this simple construction, in the most preferred form of this invention the type of hard seat employed will be the one depicted in FIGS. 8A, B, and C. In FIG. 8 is shown a retractable seat which is operated by a motor-driven actuator which is controlled by main control box 50. When this hard seat is retracted, as is shown in FIG. 8A, the Handling Device of this invention is able to creep up next to beds and other furniture very closely to the patient. Once the patient has been lifted and is securely within the soft seat and is in a "suspended in air" position as described above, the Handling Device may then be backed off from the bed under its own propulsion and the retractable hard seat can then be extended by energizing actuator 67 of FIG. 8 which is housed in and fastened to main frame 6 on one end and to the flexible retractable hard seat on the other end, and wired through the main control box 50 to the electrical storage battery. The patient may then be subsequently lowered onto the hard seat, while retaining the soft seat under their person for such time as they later deem it desirable to become removed from this Handling Device once again.

All power for the instant Handling Device is provided by an on-board electrical storage cell preferably of the gel-cell type, an example of which has already been given. Transmission of electrical energy is accomplished through electrical cables from the battery to an insulated terminal strip within housing 6. It is from this terminal strip that the electrical energy is "tapped off" or taken for use and distribution to the other electrical elements of the unit.

The wiring of the various electrical components of this invention is straightforward. In most cases, there exists a motor which is desired to be energized in order to cause a mechanical actuator to make motion of a component part of the invention. Generally speaking, such motors are connected to the storage battery through a relay which is controlled by a switch located on the control box 50. Depressing the switch causes the relay to close a circuit, thus energizing the motor. The wiring is just that simple except in the case of when it is desired to move the vertical beam up or down. If the beam were moved up or down, it would cause an undesirable motion of the lifting means at 43 relative to the ground to occur. To compensate for this, a special arrangement is used. In such a case the pressing of the button which closes the relay circuit to the motor which activates the vertical beam also closes the circuit to a second relay which controls the movement of the lifting means. The actuators for the vertical beam motion and the lifting means motion both operate at the same speed, so that when the vertical beam is raised or lowered, the lifting means undergoes a compensatory motion so as to have no net vertical motion of the lifting means occur. This is described in more detail below, and has also been engineered into the horizontal beam motion of this device with respect to the lifting means.

The controls box 50 of FIG. 1 is depicted in a larger top view in FIG. 7. The control box contains 8 push button switches 44 on its surface and one joystick 37. The joystick is linear in 4 directions and is of the type which is suitable for motor control to effect variable speed which can also rotate through 360 degrees, and it is through this joystick that electromotive force is regulated to both m1 and m2, i.e., the motor for the propulsion 66 of this Handling Device and the motor 33 which operates the steering actuator 20 hereof. Such joystick 37 is effectively a rheostat in a series circuit between each of these motors and the supply battery. This effective rheostat regulates the voltage and hence the current available to the aforesaid motors. Through such simple arrangement, it is rendered possible to simultaneously control both the forward/backward and the left/right movements of this Handling Device allowing the driver hereof total 360 degree motion and maneuverability.

The various switches 44 are identical to one another and are wired in series between the electrical source and the various relays which are in turn wired in series between the battery and the various motors used to drive the various actuators of this invention. The following is a description of the wiring of this invention.

Closing switch S1 actuates relay R1 which closes the circuit between the supply battery and motor M3, thus operating actuator 41 of FIG. 4 in the positive direction. (horizontal boom 64 moves out).

Closing switch S2 actuates relay R2 which closes an electrical circuit between the supply battery and motor M4 which operates actuator 31 in FIG. 4 in the positive direction. (Lifting cable 52 is let out).

Closing switch S3 actuates relay R3 which closes the circuit between the supply battery and motor M3, thus operating actuator 41 of FIG. 4 in the negative direction. (horizontal boom 64 moves into 62).

Closing switch S4 actuates relay R4 which closes an electrical circuit between the supply battery and motor M4 which operates actuator 31 in FIG. 4 in the negative direction. (lifting cable 52 is drawn inward)

Relay R1 is connected to R2 in such a way that whenever switch S1 is pressed thus causing inner horizontal boom member 64 to move outward from 62, relay R2 simultaneously energizes motor M4 in the positive sense which causes actuator 31 to release lifting means 52. By such design, whenever the inner horizontal boom member is moved inwards or outwards, a compensatory movement in the lifting means 52 is caused which results in the result of no net vertical movement of the lifting means 52 and hence any subject who is held within the soft seat which is thereto attached at the time. In converse fashion, relay R3 is connected to R4 in such a way that whenever switch S3 is pressed thus energizing relay R3 and causing inner horizontal boom member 64 to move inward with respect to 62, relay R4 simultaneously energizes motor M4 in the negative sense which causes actuator 31 to take up lifting means 52. By such design, again, whenever the inner horizontal boom member 64 is moved inwards or outwards, a compensatory movement in the lifting means 52 is caused which results in the result of no net vertical movement of the lifting means 52 and hence any subject who is held within the soft seat which is thereto attached at the time.

S5 controls relay R8 which controls motor M6 which operates actuator 21 of FIG. 4 in the downward direction, so as to lower the vertical beam 78. In the absence of other motion, this would cause the seat to be lowered. However, when relay R8 is energized, it simultaneously activates relay R4 which in turn energizes motor M4 which causes actuator 31 to operate in the negative direction, thus taking in the lifting means 52 with the net result that no net rise or fall of the lifting means with respect to the ground occurs. Similarly, relays R7 and R2 are analogously connected to compensate likewise whenever S6 which controls relay R7 which controls motor M6 which operates actuator 21 of FIG. 2 in the upward direction is activated, causing the seat to be raised, actuator 31 is energized to compensate by letting out lifting means 52 in such fashion that no net rise or fall of the lifting means 52 with respect to the ground occurs.

S7 controls relay R6 which controls motor M5 which operates the collapsible hard seat actuator 67 of FIG. 8 in the outward direction.

S8 controls relay R5 which controls motor M5 which operates hard seat actuator 67 of FIG. 8 in the inward position causing the hard seat to be drawn inward, collapsed, for storage or maneuverability.

When S2 or S4 are pushed, up or down control of lifting means 52 is effected without any accompanying movement by other parts of this invention.

The terms "control means" as used in this specification and the appended claims means all electrical wiring, relays, joysticks, and switches which are necessary for causing controlled energization of any motor, actuator, or other electrically-operated component of this invention.

This invention contemplates the use of radio-controlled control box, similar to the one 50, which may be used to advantage whenever having a cord attached between box 50 and the unit at point 39 is disadvantageous.

This invention also contemplates the use of infrared sensors to sense when this handling device is too near a wall or other object. When the handling device comes too near a wall, the infrared device breaks the electrical circuit to the drive motor, thus disabling further motion of this handling device towards such an obstacle and only permitting motion opposite to that which was employed up to the time just prior to encountering the obstruction. Such infrared sensors and the associated electrical circuitry necessary to carry out the end just mentioned are well-known to those skilled in the electrical art.

This invention also contains in its most preferred form an on-board electrical cord which is on a spring-loaded reel. This electrical cord is fed into a battery charger circuit which consists of a standard rectifier, such that the storage cell of this invention may be recharged by merely plugging into a wall receptacle during convenient period of non-use of this invention. Operation of all motors is disabled during charging.

Additionally, a hinge may be incorporated in to the vertical beam along its length for enabling the partial folding of the vertical beam, in order that the instant device may be conveniently loaded into a van or other motive transportation.

Where no indication is made otherwise, all descriptions of features herein set forth are descriptive of the preferred embodiment of this invention.

Consideration must be given to the fact that although this invention has been described and disclosed in relation to certain preferred embodiments, obvious equivalent modifications and alterations thereof will become apparent to one of ordinary skill in this art upon reading and understanding this specification and the claims contained herein. Accordingly, the presently disclosed invention is intended to cover all such modifications and alterations, and is limited only by the scope of the claims which follow.

We claim:

1. A handling device which comprises:
   a) a base including a plurality of wheels;
   b) a vertical beam assembly attached to said base;
   c) a horizontal boom assembly having a front portion and a rear portion, said horizontal boom attached to said vertical beam so as to define the vertex of an angle alpha at the point of their intersection; and
   d) at least one device through which steering and propulsion are effectively controlled which comprises:
      i) a casing having a top portion, a bottom portion, and a wall portion;
      ii) a shaft rotably mounted within said casing, said shaft having upper and lower end portions;
      iii) a sprocket disposed on the upper end portion of said shaft;
      iv) a first gear disposed on the lower end portion of said shaft;
      v) an axle shaft extending essentially perpendicularly from said wall portion of said casing;
      vi) a drive wheel mounted to said axle shaft;
      vii) a second gear which is in mechanical contact with said wheel and which is disposed about said axle shaft such that said second gear is in meshing contact with said first gear;
      viii) means for holding said wheel on said axle shaft;
      ix) an outer frame housing which is rotably disposed about said casing; and
      x) means for causing rotation of said casing within said outer frame housing.

2. The device according to claim 1 wherein said means for causing rotation of said casing within said outer frame includes a gear portion disposed radially about said top portion of said casing.

3. The device of claim 1, further comprising means for propulsion.

4. The device of claim 1, further comprising means for steering.

5. The device of claim 1, further comprising seating means.

6. The device of claim 5, further comprising hinged arm supports.

7. The device of claim 1, further comprising a lifting means having a free end wherein said free end is accessible at said front portion of said horizontal boom.

8. The device of claim 1 wherein said angle alpha is in the range of about 15 degrees to 165 degrees.

9. The handling device of claim 3 wherein said means for propulsion includes a differential.

10. The handling device of claim 7 wherein a soft seat is connected to the end of said lifting means.

11. The handling device of claim 3 wherein said means for propulsion includes an electric motor.

12. The handling device of claim 4 wherein said means for steering includes an electric motor.

13. The handling device of claim 1 wherein said base comprises:
   i) a flat floor portion;
   ii) a box-like housing portion having upper, lower, front, and rear portions, said housing portion located atop said flat floor portion; and
   iii) two fork portions which protrude from the front of said housing portion at said lower portion.

14. The device according to claim 13 wherein each of said fork portions has a rolling wheel attached to their undersides.

15. A device through which steering and propulsion may be controlled which comprises:
   a) a casing having a top portion, a bottom portion, and a wall portion;
   b) a shaft rotably mounted within said casing, said shaft having upper and lower end portions;
   c) a sprocket disposed on the upper end portion of said shaft;
   d) a first gear disposed on the lower end portion of said shaft;
   e) an axle shaft extending essentially perpendicularly from said wall portion of said casing;
   f) a drive wheel mounted to said axle shaft;
   g) a second gear which is in mechanical contact with said wheel and which is disposed about said axle shaft such that said second gear is in meshing contact with said first gear;
   h) means for holding said wheel on said axle shaft;
   i) an outer frame housing which is rotably disposed about said casing; and
   j) means for causing rotation of said casing within said outer frame housing.

16. The device according to claim 15 wherein said means for causing rotation of said casing within said outer frame includes a gear portion disposed radially about said top portion of said casing.

17. The device of claim 15 wherein said casing is substantially cylindrical.

18. The device of claim 15 wherein said casing is square or rectangular in cross section.

19. The process of moving a heavy object which includes the step of:

mechanically attaching said heavy object to the free end of the lifting means of the device described in claim 7.

20. The process of claim 19 further comprising the step of transfer of said heavy object onto a seating means.

* * * * *